(12) United States Patent
Braun et al.

(10) Patent No.: US 7,119,464 B2
(45) Date of Patent: Oct. 10, 2006

(54) SPINDLE MOTOR

(75) Inventors: Dieter Braun, Spaichingen (DE); Joerg Hoffmann, Mettlach (DE)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 11/003,833

(22) Filed: Dec. 3, 2004

(65) Prior Publication Data

US 2005/0140226 A1 Jun. 30, 2005

(30) Foreign Application Priority Data

Dec. 24, 2003 (DE) ................................ 103 61 183

(51) Int. Cl.
*H02K 5/16* (2006.01)
(52) U.S. Cl. ........................................................ 310/90
(58) Field of Classification Search .................. 310/90, 310/90.5
See application file for complete search history.

(56) References Cited

U.S. PATENT DOCUMENTS 5,357,163 A * 10/1994 Minakuchi et al. ........... 310/90

6,175,547 B1 * 1/2001 Kogure ........................ 369/269
6,252,322 B1   6/2001 Kawawada et al.
6,271,612 B1 * 8/2001 Tanaka et al. ................. 310/90
2002/0025090 A1 * 2/2002 Sakatani et al. ............. 384/107
2003/0048575 A1   3/2003 Nishimura et al.

FOREIGN PATENT DOCUMENTS

EP 0410293 1/1991

\* cited by examiner

*Primary Examiner*—Darren Schuberg
*Assistant Examiner*—Nguyen Hanh
(74) *Attorney, Agent, or Firm*—Baker & Daniels

(57) ABSTRACT

The invention relates to a spindle motor, particularly for the purpose of driving the platters in hard disk drives having a baseplate, a stator arrangement that is stationary with respect to the baseplate, a shaft and a bearing system to rotatably support a rotary driven rotor connected to the shaft. In order to create a spindle motor in which it is possible to connect the shaft to the rotor with a high holding force and improved running precision, provision is made according to the invention for the shaft to be at least partly formed as a hollow shaft and for the rotor to have a shaft shoulder aligned concentric to its rotational axis which is inserted into the hollow shaft and firmly connected to the shaft.

9 Claims, 1 Drawing Sheet

SPINDLE MOTOR

BACKGROUND OF THE INVENTION

The invention relates to a spindle motor particularly for the purpose of driving the platters in hard disk drives.

These kinds of spindle motors for hard disk drives comprise a baseplate or a base flange, a stator arrangement that is stationary with respect to the baseplate, a shaft and a bearing system to rotatably support a rotary driven rotor connected to the shaft. The bearing system preferably takes the form of a hydrodynamic bearing system. However, preloaded roller bearing systems can also be used.

The rotor is generally connected to the shaft by means of an interference fit. For this purpose, the rotor is provided with a bore concentric to its rotational axis and having a specific diameter and a specific length into which one end of the shaft is pressfitted. The outside diameter of the shaft is slightly larger than the inside diameter of the rotor bore. This interference is chosen in such a way that a minimum adhesion coefficient, i.e. a specific holding force, is ensured along the entire length of the joint but that a maximum adhesion coefficient is not exceeded which could otherwise cause excessive stress to the components.

The trend for hard disk drives is towards increasingly smaller and flatter disk drives so that the overall height of the spindle motors applied here has to be reduced more and more. One way of reducing the overall height is to reduce the potential length of the joint between the rotor and the shaft with the result that the required holding force may not necessarily be achieved. If the interference is increased in compensation, this can lead to damage to the components during the pressfitting process.

Moreover, due to component and assembly tolerances and an inadequate joint length, greater or smaller deviations between the actual and the theoretic time-invariant rotational axis could occur when the rotor is mounted on the shaft. These deviations can stem from the fact that the central axis of the rotor does not correspond exactly to the central axis of the shaft that carries the rotor. This results in an undesirable large rotor runout (RRO: repeatable runout), both axial (lateral runout) and radial (radial runout), tilting of the rotor with respect to the rotational axis of the shaft and in reduced shock resistance.

SUMMARY OF THE INVENTION

It is thus the object of the invention to provide a spindle motor particularly for the purpose of driving the platters in hard disk drives which makes it possible for the shaft and the rotor to be connected together with a high holding force and high precision, even when the overall height of the motor is small.

According to the invention, the shaft is formed to be at least hollow in part, the rotor having a shaft shoulder aligned concentrically to its rotational axis which is inserted into the hollow shaft and firmly fixed to the shaft.

The advantage of the invention is that it increases the effective length of the joint or the effective connecting surface between the shaft shoulder on the rotor and the (hollow) shaft, the joint length of the overlapping area of connection preferably being at least half as long as the overall length of the hollow shaft. Increasing the guiding ratio (1/d) makes it possible to achieve excellent right angularity and firm seating of the shaft shoulder in the hollow shaft. This arrangement goes to decrease both the radial as well as the axial runout of the rotor and to reduce its tilt with respect to the rotational axis of the shaft. Over and above this, the shock resistance of the motor is also improved.

If it has been decided to use an interference fit between the shaft shoulder on the rotor and the hollow shaft, the interference of the shaft shoulder with respect to the inside diameter of the hollow shaft can be smaller in total due to the long length of the joint, so that the rotor can be connected to the shaft in a manner that is sparing of the components.

The connection can, however, also be made by bonding in which the fitting together of shaft shoulder and hollow shaft can also bring its advantages.

To achieve high precision, and above all reproducible precision, the shaft shoulder is preferably formed as an integral part of the rotor.

The invention can preferably be applied in spindle motors having a hydrodynamic bearing system. In an advantageous embodiment of the invention, the thrust plate—as part of the thrust bearing in the bearing system—is an integral part of the hollow shaft and is formed onto the lower end of the hollow shaft. This means that the bearing surfaces of the shaft and the thrust plate perpendicular to each other are formed with high precision as a single integral piece.

In another embodiment, the thrust plate is formed as an integral part of a plug that is inserted into the lower, open end of the hollow shaft and firmly fixed to the shaft. The connection between the plug and the hollow shaft can be either an interference fit or a bonded connection. This arrangement for the thrust plate also results in high precision and good right angularity for the bearing surfaces due to high-precision machining of the material and the long length of the connection.

BRIEF DESCRIPTION OF THE DRAWINGS

An embodiment of the invention is described in more detail below on the basis of the figures.

The figures show.

DESCRIPTION OF PREFERRED EMBODIMENTS OF THE INVENTION

The drawings show spindle motors having a hydrodynamic bearing system for the purpose of driving platters in hard disk drives. According to the invention, instead of a hydrodynamic bearing system, a roller bearing system could also be provided.

Figure 1:
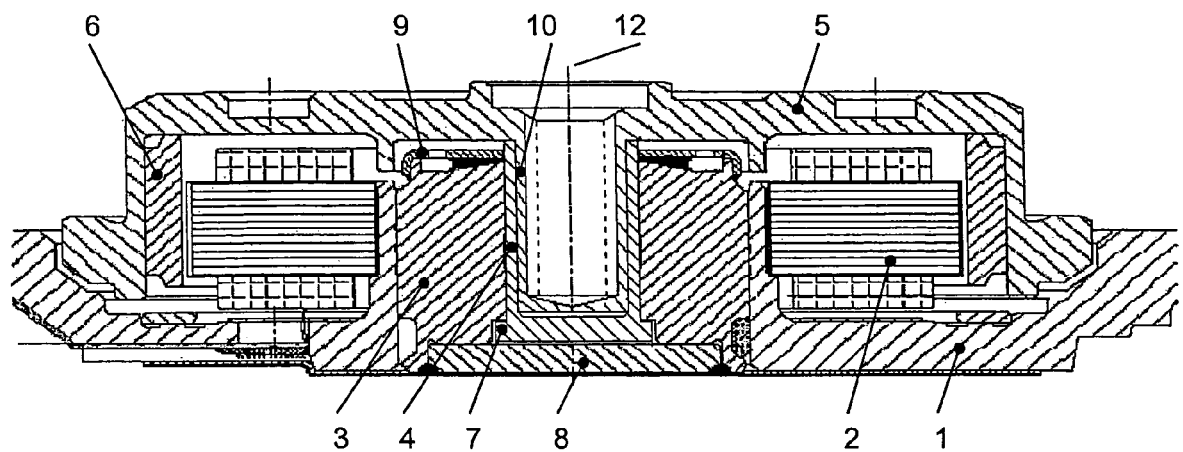
FIG. 1: a section through a first embodiment of a spindle motor for hard disk drives with the connection according to the invention between the rotor and the shaft.

The spindle motor according to FIG. 1 includes a stationary baseplate 1 on which a stator arrangement 2, comprising a stator core and windings, is arranged. A bearing sleeve 3 is firmly accommodated in a recess in the baseplate 1 and has a cylindrical axial bore in which a shaft, taking the form of a hollow shaft 4 according to the invention, is rotatably accommodated. At one end of the hollow shaft 4 the end face is sealed, whereas the other, free end of the hollow shaft carries a rotor 5 on which one or more platters (not illustrated) of the hard disk drive are arranged and fixed. An annular permanent magnet 6 having a plurality of pole pairs is arranged at the lower inside edge of the rotor 5, an alternating electrical field being applied to the pole pairs by a stator arrangement 2 spaced apart from them by means of an air gap, so that the rotor 5, together with the hollow shaft 4, is put into rotation.

In the embodiments, the hollow shaft 4 is rotatably supported in the bearing sleeve 3 by means of a hydrodynamic bearing system whose basic structural design and function is known to the technician and thus need not be described in detail here. The hydrodynamic bearing arrangement comprises a radial bearing region formed by the surfaces of the hollow shaft 4 and the bearing sleeve 3 facing each other and takes up the radial loads of the bearing arrangement.

Secondly, a hydrodynamic thrust bearing is formed by a thrust plate 7 and a covering plate 8 arranged at the lower end of the hollow shaft 4 which takes up the axial loads of the bearing arrangement. The hydrodynamic bearing system is preferably filled with a liquid fluid lubricant which keeps the surfaces of the bearing parts that rotate with respect to each other separate from one another. The axial bearing region is hermetically sealed by the covering plate 8 so that no lubricant can escape from the bearing gap.

The hollow shaft 4 protrudes from one of the ends of the bearing sleeve 3—its top end in the drawing. The bearing sleeve 3 is sealed at this end by a bearing cover 9. The hollow shaft 4 carries the thrust plate 7 at its other, lower end which, in this embodiment, is formed as an integral part of the hollow shaft 4 and extends about the hollow shaft 4 in the form of a collar. The end face of the hollow shaft 4 is sealed at this end.

According to one embodiment of the invention, the rotor 5 is connected to the hollow shaft 4 by means of a shaft shoulder 10 aligned concentric to the rotational axis 12 of the rotor 5 which is inserted into the end of the hollow shaft 4, located opposite the thrust plate 7 and open from the top, and firmly connected to the hollow shaft 4. The shaft shoulder 10 is thus an integral part of the rotor and is formed as single piece with the rotor. The length of the shaft shoulder 10 preferably corresponds to at least half the length of the hollow shaft 4, so that there is a sufficiently large connecting length between the two components. In the example according to figure 1, the shaft shoulder 10 extends over almost the entire length of the hollow shaft 4.

The shaft shoulder 10 is preferably connected to the hollow shaft 4 by means of an interference fit in which the outside diameter of the shaft shoulder 10 is slightly larger than the inside diameter of the hollow shaft 4.

Provision, however, can also be made for a bonded connection between the shaft shoulder 10 and the hollow shaft 4. In this case, the outside diameter of the shaft shoulder 10 is the same or slightly smaller than the inside diameter of the hollow shaft 4.

Figure 2:
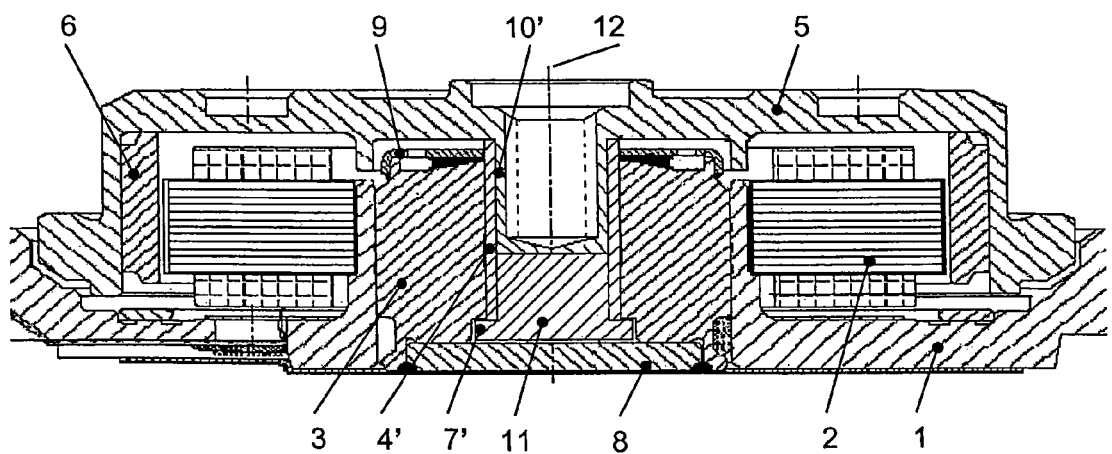
FIG. 2: a section through a second embodiment of a spindle motor for hard disk drives with the connection according to the invention between the rotor and the shaft.

A modified embodiment of a spindle motor is shown in FIG. 2. In contrast to FIG. 1, the shaft shoulder 10' inserted into the top, open end of the hollow shaft 4' is shorter and only extends to about half the length of the hollow shaft 4'. The lower, open end of the hollow shaft 4' is sealed by a plug 11 which is inserted into the hollow shaft 4'—in the same way as the shaft shoulder, but only from the other end—and firmly connected to it.

The thrust plate 7', which was an integral part of the hollow shaft in FIG. 1, is an integral part of the plug 11 in the example in FIG. 2 and is formed as an enlargement of the diameter of the plug.

To connect the plug 11 to the hollow shaft 4', either an interference fit or a bonded connection can be used.

IDENTIFICATION REFERENCE LIST

1 Baseplate
2 Stator arrangement
3 Bearing sleeve
4 (Hollow) shaft 4'
5 Rotor
6 Permanent magnet
7 Thrust plate 7'
8 Covering plate
9 Bearing cover
10 Shaft shoulder 10'
11 Plug
12 Rotational axis

The invention claimed is:

1. A spindle motor, particularly for the purpose of driving platters in hard disk drives, comprising:
   a base plate;
   a stator arrangement that is stationary with respect to the base plate;
   a shaft and a hydrodynamic bearing system on which a rotary driven rotor connected to the shaft is rotatably supported, the hydrodynamic bearing system including a liquid lubricant;
   the shaft being formed at least partly as a hollow shaft and the rotor having a shaft shoulder aligned concentrically to its rotational axis, said shoulder disposed within and firmly fixed to the shaft;
   said bearing system comprising at least one radial bearing region formed by an outer surface of said shaft and a bearing sleeve having an inner surface surrounding said shaft, said bearing system further comprising a thrust bearing formed by a thrust plate arranged at a lower end of the hollow shaft and a covering plate;
   said thrust plate and said hollow shaft constituting a monolithic element.

2. A spindle motor according to claim 1, characterized in that the connection between the shaft shoulder and the hollow shaft is an interference fit.

3. A spindle motor according to claim 1, characterized in that the connection between the shaft shoulder and the hollow shaft is a bonded connection.

4. A spindle motor according to claim 1, characterized in that the shaft shoulder is a monolithic part of the rotor.

5. A spindle motor according to claim 1, characterized in that the shaft shoulder is a monolithic part of the rotor.

6. A spindle motor, particularly for the purpose of driving platters in hard disk drives, comprising:
   a base plate;
   a stator arrangement that is stationary with respect to the base plate;
   a shaft and a hydrodynamic bearing system on which a rotary driven rotor connected to the shaft is rotatably supported, the hydrodynamic bearing system including a liquid lubricant;
   the shaft being formed at least partly as a hollow shaft and the rotor having a shaft shoulder aligned concentrically to its rotational axis, said shoulder disposed within and firmly fixed to the shaft;
   said bearing system comprising at least one radial bearing region formed by an outer surface of said shaft and a bearing sleeve having an inner surface surrounding said shaft, said bearing system further comprising a thrust bearing formed by a thrust plate arranged at a lower end of the hollow shaft and a covering plate;

said thrust plate constituting a monolithic element with a plug that is inserted into the hollow shaft and firmly connected to the hollow shaft.

7. A spindle motor according to claim 6, characterized in that the connection between the plug and the hollow shaft is an interference fit.

8. Spindle motor according to claim 6, characterized in that the connection between the plug and the hollow shaft is a bonded connection.

9. A spindle motor according to claim 6, characterized in that the rotor shaft shoulder is a monolithic part of the rotor.

* * * * *